United States Patent
Miura et al.

(10) Patent No.: US 7,042,188 B2
(45) Date of Patent: May 9, 2006

(54) SERVO MOTOR WITH A BUILT-IN DRIVE CIRCUIT

(75) Inventors: Hiromasa Miura, Nagano-ken (JP); Toshiyuki Noda, Nagano-ken (JP)

(73) Assignee: Tamagawa Seiki Kabushiki Kaisha, Nagano-ken (JP)

( * ) Notice: Subject to any disclaimer, the term of this patent is extended or adjusted under 35 U.S.C. 154(b) by 12 days.

(21) Appl. No.: 10/703,486

(22) Filed: Nov. 10, 2003

(65) Prior Publication Data
US 2004/0222764 A1    Nov. 11, 2004

(30) Foreign Application Priority Data
May 7, 2003    (JP) .............................. 2003-129166

(51) Int. Cl.
*G06B 1/06*    (2006.01)
(52) U.S. Cl. ...................... 318/652; 318/560; 318/638; 318/650; 318/138; 318/439
(58) Field of Classification Search ........ 318/560–650, 318/138, 254, 430, 700
See application file for complete search history.

(56) References Cited

U.S. PATENT DOCUMENTS

| | | | |
|---|---|---|---|
| 2,906,983 A | * | 9/1959 | Jenney ...................... 338/116 |
| 4,350,941 A | * | 9/1982 | McClure et al. ............ 318/603 |
| 5,327,055 A | * | 7/1994 | Danielson et al. .......... 318/366 |
| 5,384,069 A | * | 1/1995 | Yoshinaga et al. ..... 252/299.01 |
| 5,912,541 A | * | 6/1999 | Bigler et al. ................ 318/600 |
| 6,445,154 B1 | * | 9/2002 | Toyozawa et al. .......... 318/700 |

FOREIGN PATENT DOCUMENTS

| | | |
|---|---|---|
| JP | 01-292505 | 11/1989 |
| JP | 04-210753 | * 7/1992 |
| JP | 07-039190 | 2/1995 |
| JP | 2002-136057 | 5/2002 |
| JP | 2003-052148 | 2/2003 |

OTHER PUBLICATIONS

Laplante, P (Editior-in-Chief)., "Comprehensive Dictionary of Electrical Engineering", 1999, CRC Press, IEEE Press, p. 441.*

* cited by examiner

*Primary Examiner*—Rina Duda
*Assistant Examiner*—Tyrone Smith
(74) *Attorney, Agent, or Firm*—Wenderoth, Lind & Ponack, L.L.P.

(57) ABSTRACT

A servo motor with a built-in drive circuit is provided in which, when power is off, positional data including multiple-rotation counting values is stored in a nonvolatile memory to thereby eliminate battery back-up, and in which the CPU of a drive control circuit portion is in charge of the multiple-rotation counting itself to thereby eliminate the circuit for multiple-rotation counting. Due to a reduction in the number of lines involved and an elimination of battery back-up, a reduction in size is achieved. The servo motor with a built-in drive circuit includes an absolute encoder for detecting rotation of a servo motor portion and an electromagnetic mechanical brake, in which, when the power is off, the positional data at that time is stored in a nonvolatile memory.

4 Claims, 2 Drawing Sheets

SERVO MOTOR WITH A BUILT-IN DRIVE CIRCUIT

BACKGROUND OF THE INVENTION

1. Field of the Invention

The present invention relates to a servo motor with a built-in drive circuit. In particular, the present invention relates to a novel improvement of a servo motor for attaining a reduction in size and in numbers of wiring lines. The improvement can be achieved such that when, at a time power is off, a brake is engaged, positional data at that time obtained from an absolute encoder is stored in a nonvolatile memory, and multiple-rotation data is read from the nonvolatile memory when the power is turned on.

2. Description of the Related Art

A motor encoder construction may be mentioned as an example of a conventionally used servo motor with a built-in drive circuit of this type (see, for example, JP 62-278408 A and U.S. Pat. No. 5,912,541).

In the motor encoders as disclosed in JP 62-278408 A and U.S. Pat. No. 5,912,541, the motor portion is integrated with the encoder, and the drive circuit portion as the driver is constructed in a form of a casing separate from the motor main body.

The conventional servo motors, constructed as described above, have the following problems.

Regarding the built-in absolute encoder, all the angle data thereof is output to the exterior through lines; and when the power is off, requisite absolute multiple-rotation data is output to the exterior through lines by battery back-up, so that the number of lines connected to the servo motor is rather large. In the case in which multi-channel encoders are used for a single apparatus, the number of lines connected to each encoder is very large, so that the wiring thereof requires a lot of labor.

Further, to detect positional data including a multiple-rotation counting value, a back-up power source is required, and the configuration of the encoder itself constitutes an obstruction to a reduction in size.

SUMMARY OF THE INVENTION

The present invention has been made with a view toward solving the above problems in the prior art. It is accordingly an object of the present invention to provide a servo motor with a built-in drive circuit including an absolute encoder in which the CPU of a drive control circuit portion controls multiple-rotation counting and in which when the power is turned off, positional data including a multiple-rotation counting value is stored in a nonvolatile memory; and when the power is off, a motor shaft is locked by an electromagnetic mechanical brake, and when the power is on, the stored data is read to restore the positional data, thereby achieving a reduction in size and in the number of lines.

According to the present invention, there is provided a servo motor with a built-in drive circuit in which a servo motor portion provided in a cylindrical case and composed of a stator and a rotor is servo-driven by a sensor circuit portion, a drive control circuit portion, and a motor drive circuit portion, the servo motor including an absolute encoder for detecting rotation of the servo motor portion, and an electromagnetic mechanical brake which is released when the servo motor portion is being driven and which is engaged by an action of a spring when the servo motor portion is not to be driven, in which, when power is off, positional data at that time is stored in a nonvolatile memory. Further, in the servo motor with the built-in drive circuit, the absolute encoder is not equipped with any battery back-up.

DESCRIPTION OF THE PREFERRED EMBODIMENT

A servo motor with a built-in drive circuit according to a preferred embodiment of the present invention is described hereinafter with reference to the drawings.

Figure 1:
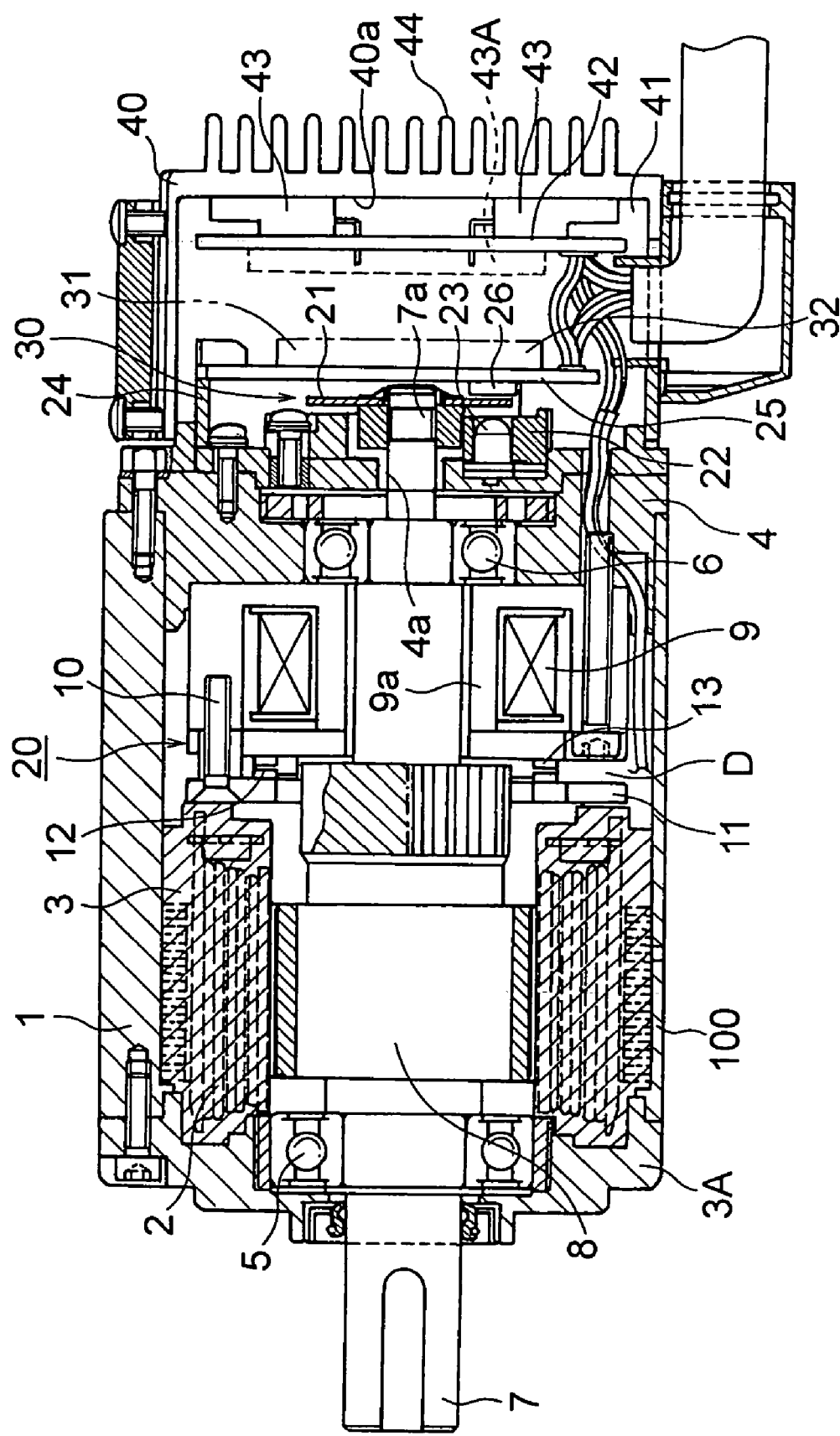
FIG. 1 is a sectional view of a servo motor with a built-in drive circuit according to the present invention.

In FIG. 1, reference numeral 1 indicates a cylindrical case having a stator 3 around which a stator winding 2 is wrapped. A front cover 3A and a rear cover 4 are mounted to both ends of the cylindrical case 1.

A rotation shaft 7 is rotatably supported by bearings 5 and 6 respectively provided in the front cover 3A and the rear cover 4. A rotor 8 situated inside the stator 3 is rotatably provided, and an electromagnetic drive portion 9 is provided in the rear cover 4. The stator 3, the rotor 8, and an absolute encoder 30 form a servo motor portion 100.

A stationary plate 11 is secured to the front cover 3A side end of the electromagnetic drive portion 9 through the intermediation of a bolt 10 so as to maintain a gap D therebetween.

A stationary brake plate 12 and a movable brake plate 13 are arranged in the gap D. The stationary brake plate 12 is secured to the rotor 8 side, and the movable brake plate 13 is connected to the electromagnetic drive portion 9 through the intermediation of a well-known spring (not shown) inside a casing 9a of an electromagnetic mechanical brake 20.

Thus, when the electromagnetic drive portion 9 is not being energized, the movable brake plate 13 is caused to abut the stationary brake plate 12 by the resilient force of the spring to secure the rotation of the rotor 8. When the electromagnetic drive portion 9 is energized, the movable brake plate 13 is pulled against the resilient force of the spring to thereby release the stationary brake plate 12, making it possible for the rotor 8 to rotate.

The stationary brake plate 12, the movable brake plate 13, and the electromagnetic drive portion 9 form the electromagnetic mechanical brake 20, which is of a well-known type.

The rotation shaft 7 has a protruding shaft portion 7a which is passed through an opening 4a of the rear cover 4 to protrude therefrom. The protruding shaft portion 7a is equipped with a code plate 21, and a retaining plate 22 provided on the rear cover 4 is equipped with a light emitting member 23.

A sensor circuit board 25 composed of a printed board is provided on the rear cover 4 through the intermediation of a support member 24, and is secured in position on the outer side, that is, the rear side, of the code plate 21.

A light receiving member 26 is provided on one surface of the sensor circuit board 25. The light emitting member 23, the code plate 21, and the light receiving member 26 constitute a well-known absolute encoder 30 as a rotation detector. It is also possible to use a well-known resolver instead of this encoder.

Provided on the other surface of the sensor circuit board 25 are a well-known sensor circuit portion 31 composed of an IC and a drive control circuit portion 32 including a well-known CPU. The sensor circuit portion 31 performs power and signal processing on the absolute encoder 30 to exclusively detect positional data within one rotation, thus supplying it to the drive control circuit portion 32.

Since the drive control circuit portion 32 is in charge of multiple-rotation counting, there is no need for the sensor circuit portion 31 to be equipped with a multiple-rotation counting circuit portion. Total positional data inclusive of multiple-rotation counting is stored in a nonvolatile memory 200 contained in the drive control circuit portion 32.

The electromagnetic mechanical brake 20 is controlled by the drive control circuit portion 32. When the drive circuit is not operating, there is no fear, for example, of the electromagnetic mechanical brake 20 being released.

A cup-shaped sensor cover 40 formed of a material having a satisfactory heat radiation property, such as aluminum, (other materials are possible) is mounted to the rear side of the rear cover 4 so as to cover the encoder 30.

On the inner surface of the sensor cover 40, there is provided a holder 41, to which is mounted a motor drive board 42 composed of a printed board. The motor drive board 42 has a power device 43 composed of a power transistor or the like, which is held in contact with and joined to the inner surface 40a of the sensor cover 40, thus allowing heat transmission and heat radiation.

On the surface of the sensor cover 40, there are formed cooling fins 44, by means of which heat radiation with high efficiency is possible.

As is well known in the art, on the motor drive board 42, there is provided a motor drive circuit 43A for driving the three-phase stator winding 2 by the power device 43, and the drive control circuit portion 32 drives to control the motor drive circuit 43A.

The outer diameters of the sensor circuit board 25 and the motor drive board 42 are smaller than the inner diameter of the sensor cover 40 and the outer diameter of the servo motor portion 100. The sensor circuit board 25 and the motor drive board 42 are arranged side by side inside the sensor cover 40, and are spaced apart from each other in the axial direction thereof.

Electrically, the sensor circuit portion 31, the drive control circuit portion 32, and the motor drive circuit 43A are formed as independent circuits, and are constructed without using any electrical isolation circuit as in the prior art.

Figure 2:
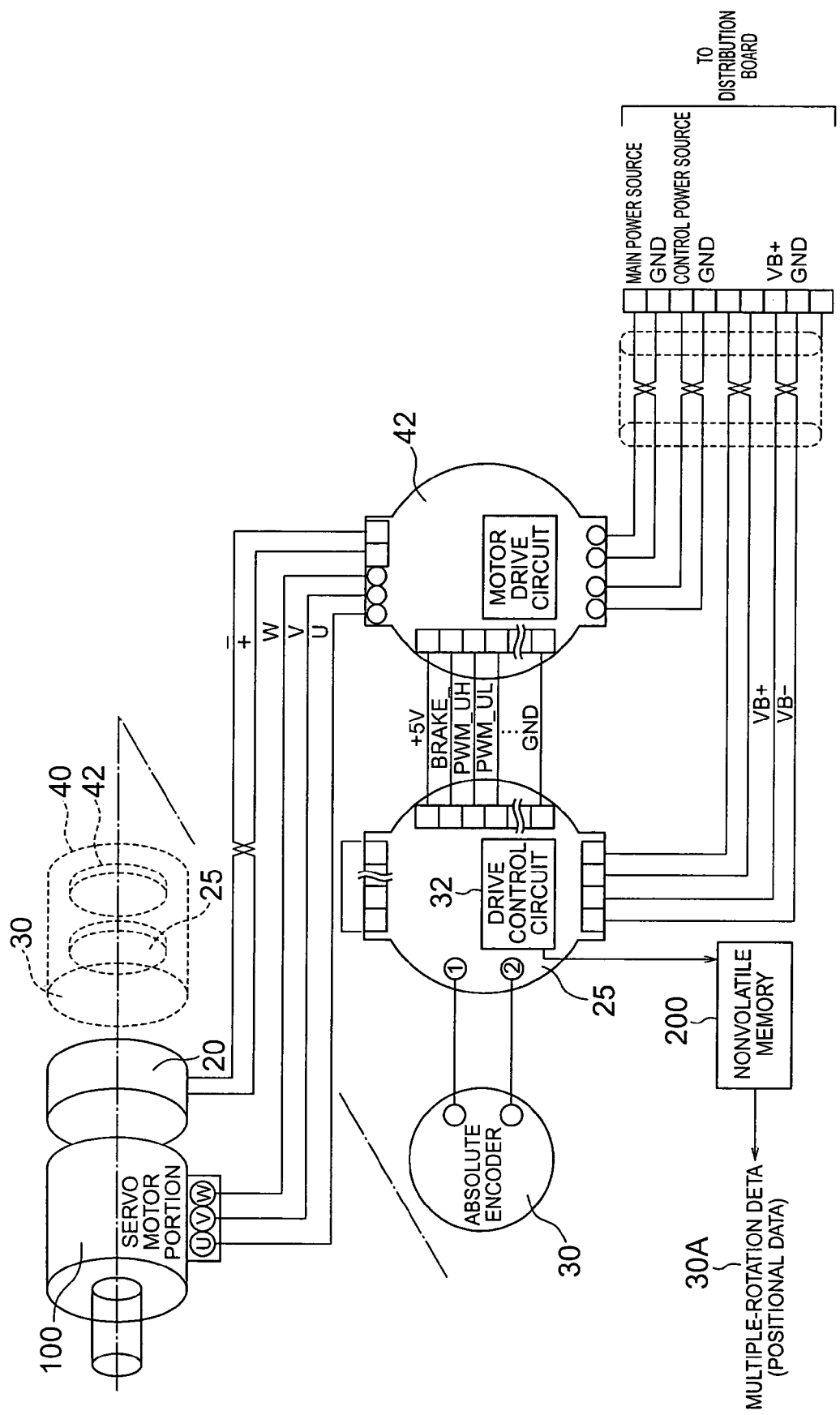
FIG. 2 is a schematic diagram showing an electrical construction of each portion of FIG. 1.

Note that the boards 25 and 42 of FIG. 1 described above are constructed as shown in the schematic diagram of FIG. 2, which shows how they are electrically connected.

Next, an operation of this servo motor will be described. First, in the above-described construction, upon turning on the power, the drive control circuit portion 32 reads stored positional data from the nonvolatile memory 200, and takes in absolute positional data within one rotation from the encoder portion. The two kinds of data thus read are compared with each other to make sure that no great difference has been generated in the positional data within one rotation. At the same time, positional data including multiple-rotation counting values is reconstructed.

Thereafter, the electromagnetic drive portion 9 is operated to bring the motor into a state in which its control is possible. Further, on the basis of a drive command (not shown) from outside, servo drive of the servo motor portion 100 is started, using an encoder signal as a position feedback signal.

The CPU of the drive control circuit portion 32 is in charge of multiple-rotation counting. Thus, the drive control circuit portion 32 always retains the total positional data including multiple-rotation counting values.

When, in the above-described state, the power is turned off, the drive control circuit portion 32 detects a reduction in power-supply voltage, and stops the servo drive of the servo motor portion 100. Further, the electromagnetic mechanical brake 20 is released, and the movable brake plate 13 is pressed against the stationary brake plate 12 by the resilient force of the spring to forcibly stop the rotation of the rotor 8. At this time, positional data including multiple-rotation counting values is stored in the nonvolatile memory 200.

When the power is off, the rotation shaft 7 does not rotate due to the operation of the electromagnetic mechanical brake 20.

When, thereafter, the power is turned on again, the drive control circuit portion 32 reads the stored positional data from the nonvolatile memory 200, and further, reads positional data within one rotation from the absolute encoder 30, making sure that there is no great difference between the two kinds of data. Further, re-building of positional data including multiple-rotation counting values is started, and the electromagnetic mechanical brake 20 is engaged to bring the servo motor 100 into the state in which its driving is possible. Further, when the power is off, the positional data at that time is stored in the nonvolatile memory 200, and at the same time, rotation of the rotation shaft 7 is prevented by the action of the electromagnetic mechanical brake 20, so that no well-known battery back-up is required when the power is off.

The servo motor with a built-in drive circuit of the present invention, constructed as described above, provides the following effects.

First, since the CPU of the drive control circuit portion is in charge of the multiple-rotation counting, it is possible to eliminate the circuit for multiple-rotation counting.

Second, when the power is off, the positional data at that time is stored in the nonvolatile memory, and at the same time, rotation of the rotation shaft is prevented by the action of the electromagnetic mechanical brake, so that no battery back-up circuit is required when the power is off.

Third, even if no battery back-up is effected as in the prior art, it is possible to store positional data from that time in the nonvolatile memory, and there is no need to provide a built-in battery for back-up, thereby contributing to a reduction in the size of the servo motor.

What is claimed is:

1. A servo motor with a built-in drive circuit in which a servo motor portion provided in a cylindrical case and composed of a stator and a rotor is servo-driven by a sensor circuit portion, a drive control circuit portion, and a motor drive circuit portion, said servo motor comprising:
an absolute encoder operable to detect rotation of said servo motor portion;
a sensor circuit board;
a motor drive board;
cooling fins operable to dissipate heat from said servo motor; and
an electromagnetic mechanical brake which is released when said servo motor portion is being driven,
wherein said electromagnetic mechanical brake is engaged by an action of a spring when said servo motor portion is not to be driven,
wherein said electromagnetic mechanical brake comprises:
a stationary brake plate; and
a movable brake plate;

wherein, when said servo motor portion is not to be driven, said movable brake plate is pressed against said stationary brake plate by the action of said spring;

wherein said drive control circuit portion is coupled to said sensor circuit board;

wherein said motor drive circuit portion and a power device are coupled to said motor drive board;

wherein said drive control circuit portion is operable to control said electromagnetic mechanical brake and said motor drive circuit portion; and wherein, when power is off, positional data at that time is stored in a nonvolatile memory.

2. A servo motor with a built-in drive circuit according to claim 1, wherein said absolute encoder is not equipped with any battery back-up.

3. A servo motor with a built-in drive circuit according to claim 1, wherein, upon being turned on, said drive control circuit portion reads the stored positional data from the nonvolatile memory, and takes in absolute positional data within one rotation from said absolute encoder.

4. A servo motor with a built-in drive circuit according to claim 3, wherein said drive control circuit portion compares the stored positional data read from the nonvolatile memory with the absolute positional data from said absolute encoder.

* * * * *